United States Patent [19]
Fwu

[11] Patent Number: 5,810,965
[45] Date of Patent: Sep. 22, 1998

[54] THERMAL EMBOSSING/LAMINATING SYSTEM OF PRINTING MACHINE

[76] Inventor: Jason Fwu, B1, No. 21, Alley 1, Lane 187, Wan-Ta Rd., Taipei, Taiwan

[21] Appl. No.: 834,894

[22] Filed: Apr. 7, 1997

[51] Int. Cl.⁶ .................................................. B32B 31/00
[52] U.S. Cl. ...................... 156/359; 156/555; 156/583.1; 100/171
[58] Field of Search ................................ 156/359, 379.6, 156/384, 499, 555, 580, 582, 583.1; 100/327, 160, 168, 169, 171, 176

[56] References Cited

U.S. PATENT DOCUMENTS

| | | | |
|---|---|---|---|
| 5,061,337 | 10/1991 | Fraser | 156/351 |
| 5,223,071 | 6/1993 | Gersbeck | 156/358 |
| 5,540,806 | 7/1996 | Traise | 156/555 |
| 5,639,339 | 6/1997 | Couillard | 156/555 |

*Primary Examiner*—James Sells
*Attorney, Agent, or Firm*—Bacon & Thomas

[57] ABSTRACT

A thermal embossing/laminating system of printing machine (especially for the label printing machine, letter press, flexible printing machine) including a left support, a right support, an upper roller, a lower roller with heating device, an infrared preheating device, a temperature measuring device, a drive device and a temperature controlling device. The characteristic of the system is that at least one shaft of upper roller or lower roller is disposed with a heating device, and the infrared preheating device is disposed beside the supports. A power switch, the temperature controlling device and temperature measuring device automatically detect and adjust the heating device, so that the heating (preheating) device can conduct and distribute heat to the roller and laminating film evenly. The roller and the laminating film can reach and stand at a set constant temperature. So the laminating with hot melt adhesive rolled by the rollers to be easily and planely laminated on the surface of the printed article.

9 Claims, 15 Drawing Sheets

THERMAL EMBOSSING/LAMINATING SYSTEM OF PRINTING MACHINE

BACKGROUND OF THE INVENTION

This invention relates to a thermal embossing/laminating system of printing machine (such as label printing machine, letter press, flexible printing). By means of thermal rolling, a laminating film is laminated on a printed artical to laminate them. With the thermal roller (the shaft of the roller is disposed with a heating device) and an infrared preheating device, whereby the laminating film with hot melt adhesive is thermally rolled and laminated on the surface of the printed article such as a trademark, label, tab, attaching paper, calender card and commercial print, etc. The laminating film serves to speed drying of the printed article, avoid decoloring and detachment, achieve waterproof, humidityproof and contaminationproof effect and present a better appearance, etc.

The existing laminating device used in the label printer can be substantially divided into two types, that is:

1. Laminating film without linear; and
2. Laminating film with linear.

Several shortcoming exist in the above two types of laminating devices as follow:

With respect to the laminating device for laminating film without linear, in order to laminate the printed paper, first a roll of self-attaching tape-type laminating film is torn away above the label printer and then the laminating film is rolled to laminate the printed paper. When strongly tearing the laminating film, a loud noise (as sharp noise produced when tearing apart a transparent tape for sealing a package) is created. Such noise is harmful to the operators in the factory. Moreover, the laminating film can be hardly controlled to form a plane attachment. Bubbles and crimps are often formed on the laminated surface. And the laminated surface can not be further processed hot stamping or heat transfer. In addition, the laminating operation is performed at a low speed. This is because the widely used laminating film has a length of 200M to 400M per reel (due to the self-attaching property, the laminating film cannot be cut into longer film) so that it is necessary to frequently replace the film reel. This leads to low operation efficiency. With respect to the laminating film with aqueous glue, normally it has the shortcoming of poor transparence.

With respect to the laminating device for Laminating film with linear, although the noise of tearing the laminating film without linear is reduced, the problem of slow laminating speed and low operation efficiency remain unimproved. Reversely, the problem of recovery of substrate additionally take place. In addition, in the manufacturing procedure of the laminating film with linear, the problem of environment pollution often occurs. Moreover, because the processing operation of releasing the substrate and many other pre-operation are additionally required, the manufacturing cost is increased.

In U.S. Pat. No. 5518569, this laminate film is used without adhesive. The inventor use a roller to coat a thin polymer layer on one side of the laminate film. Then cover it on the printing article. After that they use UV light to cure the polymer to fix the film to achieve the laminating effect. This is a different approach of laminating process from us.

SUMMARY OF THE PRESENT INVENTION

It is a primary object of this invention to provide a thermal embossing/laminating system of printing machine, in which a laminating film with hot melt adhesive is used for embossing and laminating the printed article. In normal state, the laminating film with hot melt adhesive is free from adhesion so that it is possible to thermally roll and laminate the film on the surface of the printed article without bubble or crimp. Also, the film has excellent transparency, fast laminating speed, high efficiency and can further process hot stamping or heat transfer on the laminated surface.

It is a further object of this invention to provide the above thermal embossing/laminating system of printing machine, in which the surface of the printed article can be painted with laminating oil and then thermally rolled and laminated by the rollers of the system.

It is still a further object of this invention to provide the above thermal embossing/laminating system of printing machine, in which a embossing mold or thermal transfer mold can be disposed on the roller of the system for providing embossing or thermal transfer printing effect for the printed article. In addition, a thermal compression mold can be used for providing thermal compression printing effect.

To achieve what we said above, this invention combine left, right support, an upper roller, a lower roller, heating device, infrared preheating device, temperature measuring device, driving device and temperature controlling device. Their function will describe below.

Left and right support disposed with two columns where a slide channel is formed inside each. The center shaft hole of slide block equipped with an adjustable bearing, that its position can be adjusted back or forward. Two projections on each side of slide block are used to insert the slide block along two columns' slide channel. A locating shaft fitted the slide block with the upper board by screw. The shaft is located with an adjust cylinder to press the spring between the slide block and the cylinder. This device is used to adjust the pressing force of the upper roller. An eccentrical wheel is fitted around each end of the fixed shaft. A lower roller bearing is disposed on the fixed shaft.

The upper roller, that with two side of shaft fixed on a forward and backward adjustable bearing located on the slide block of left support, and bearing located at the center hole at the fixed block of right support, keep the roller rotate freely. The shaft equipped with heating device. The roller will keep setted constant temperature by way of the temperature measuring device and temperature controlling device on the roller. This keep the function of thermal laminating/embossing.

The lower roller, fixed by the bearing located on the fixed block of left and right support, equipped with eccentrical wheels on two side. A crank is fixed on the shaft of left eccentrical wheel. This crank will drive the eccentrical wheel to push the slide block of upper roller up. And form a space between the upper roller and the lower roller.

The whole system is heated by a heating device located inside the shaft of upper roller and a infrared preheating device beside the support. Both heating device is controlled by a temperature measuring device and temperature controlling device control the heating power supply to achieve the setted constant temperature. This make the laminating film with hot melt adhesive laminated on the printed article (such as a trademark, label, tab, attaching paper, calender card commercial print, etc) planely and easily. This invention has the feature of low noise, fast speed, high efficiency, no bubbles and crimps, no waste such as substrate to recover, no environment pollution, save energy, cost down, and good looking.

The present invention can be best understood through the following description and accompanying drawings, wherein:

BRIEF DESCRIPTION OF THE DRAWINGS

FIG. 8A-1 shows the wave forms of the temperature controlling operation of the present invention.

DETAILED DESCRIPTION OF THE PREFERRED EMBODIMENT

Figure 1:
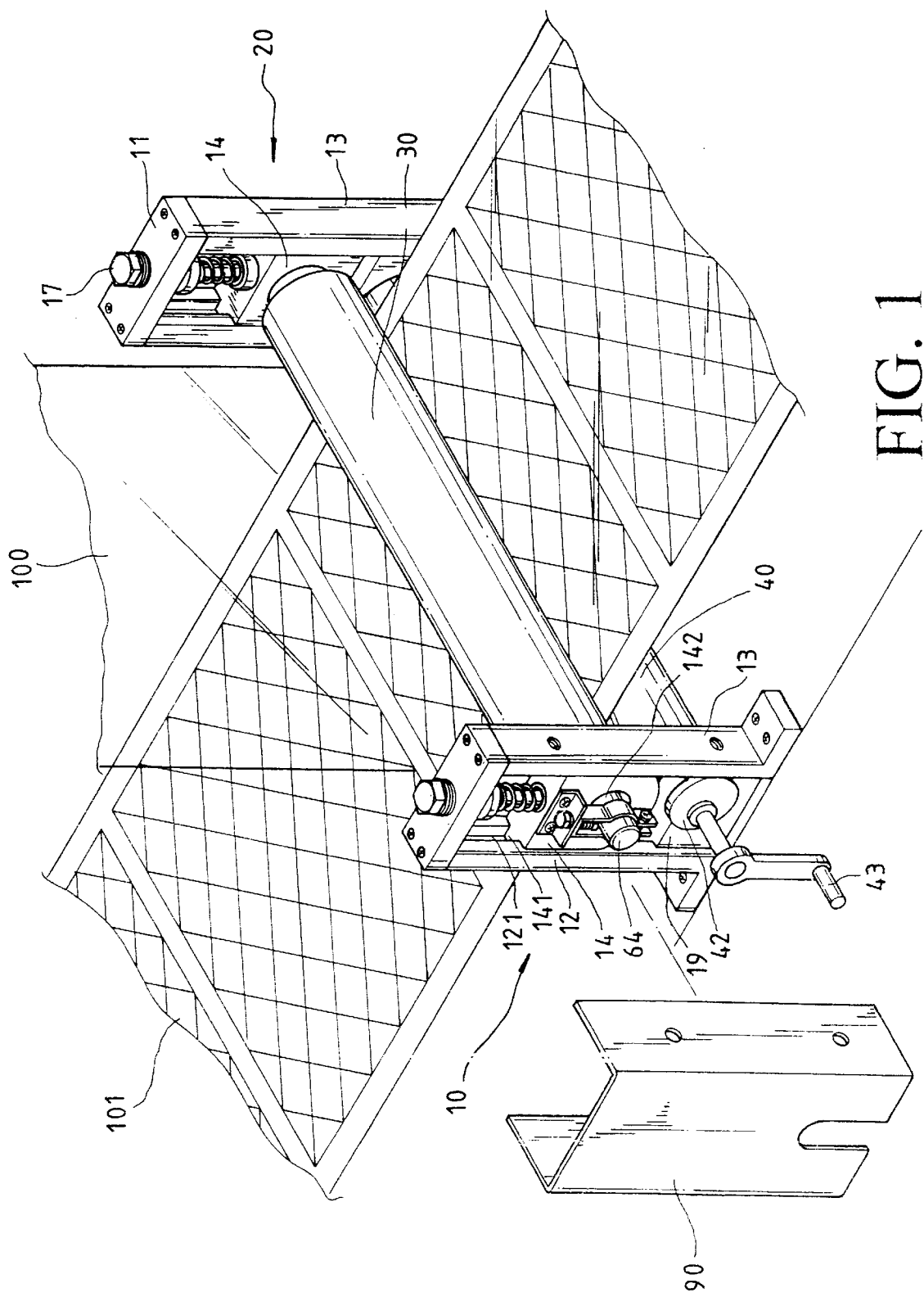
FIG. 1 is a perspective view of the present invention.
Figure 2:
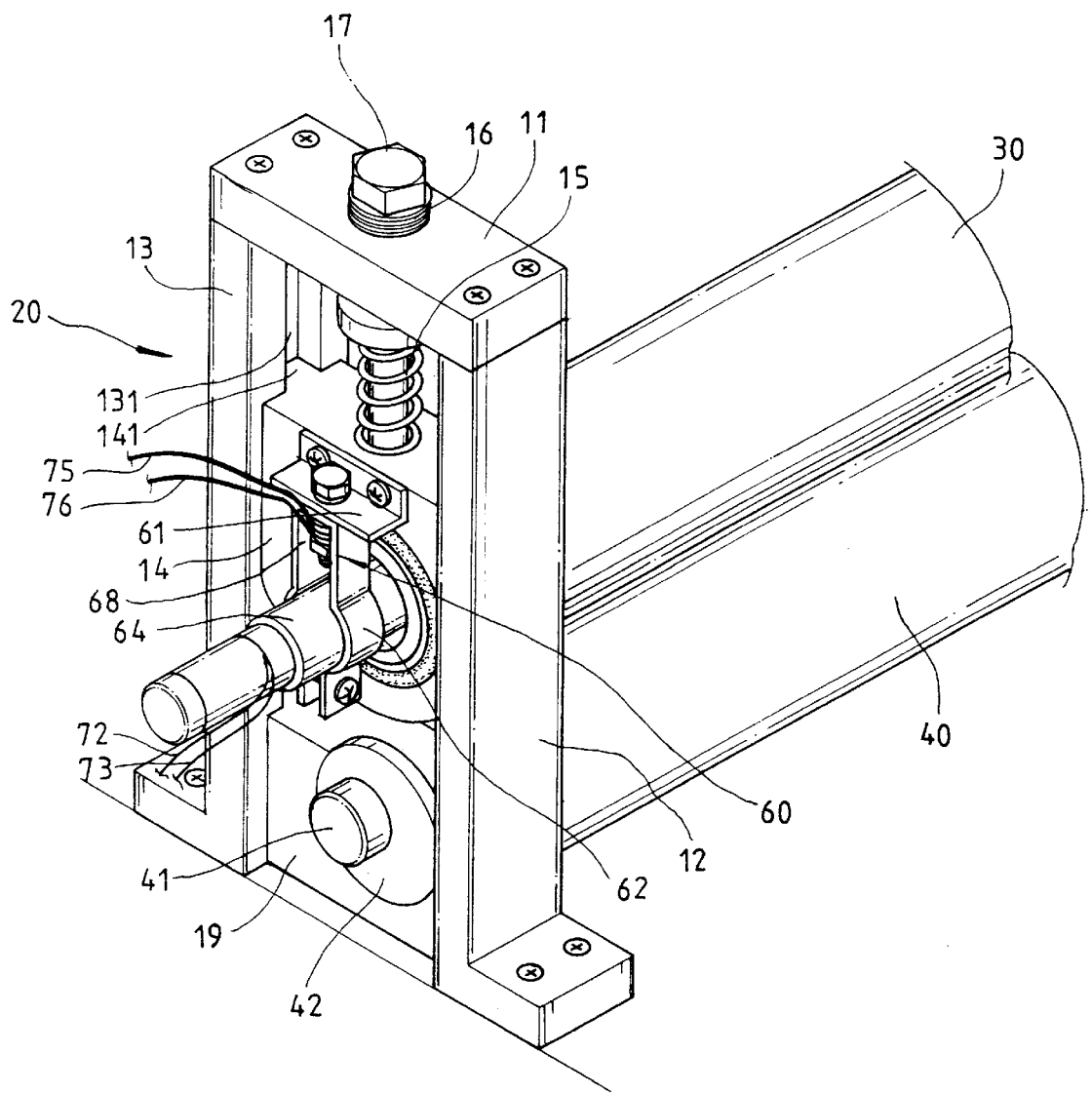
FIG. 2 is a perspective view of the heating device of the present invention.
Figure 3:
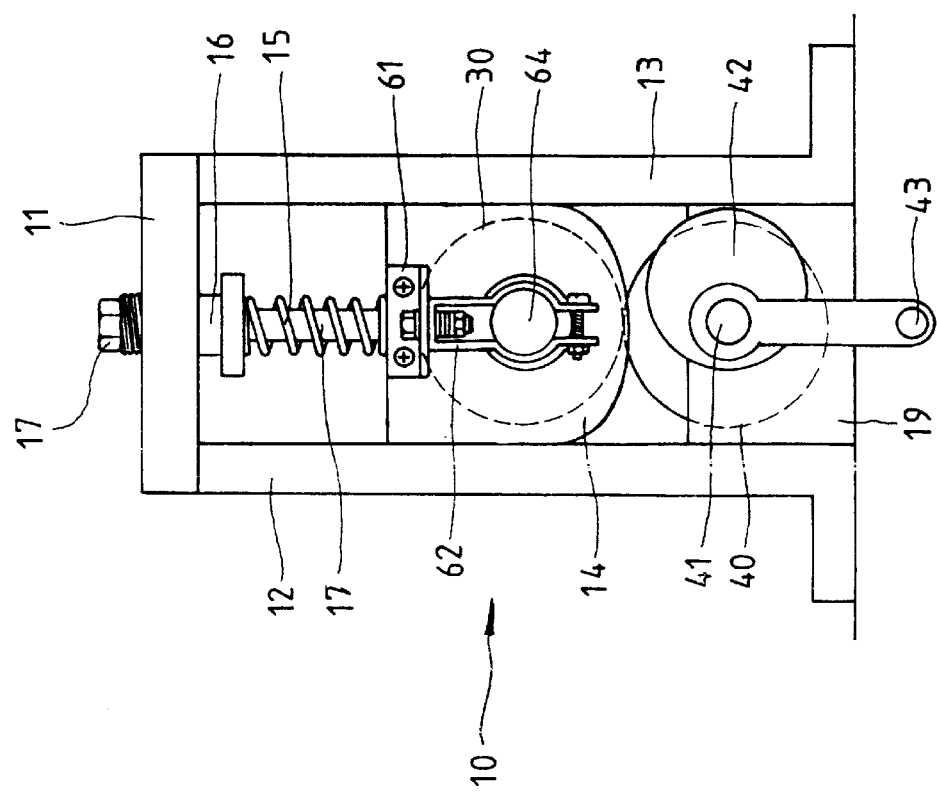
FIG. 3 is a side view of the support of the present invention.
Figure 7:
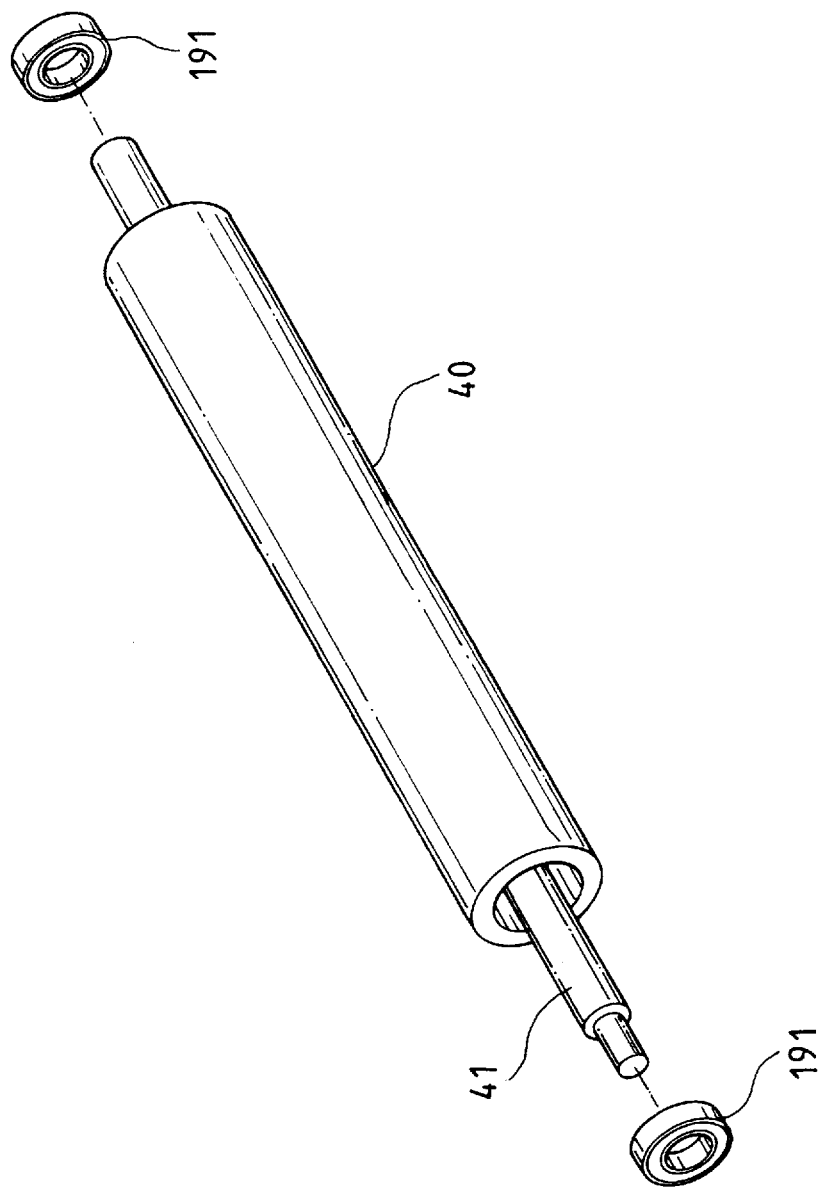
FIG. 7 shows the structure of the lower roller of this invention.
Figure 10:
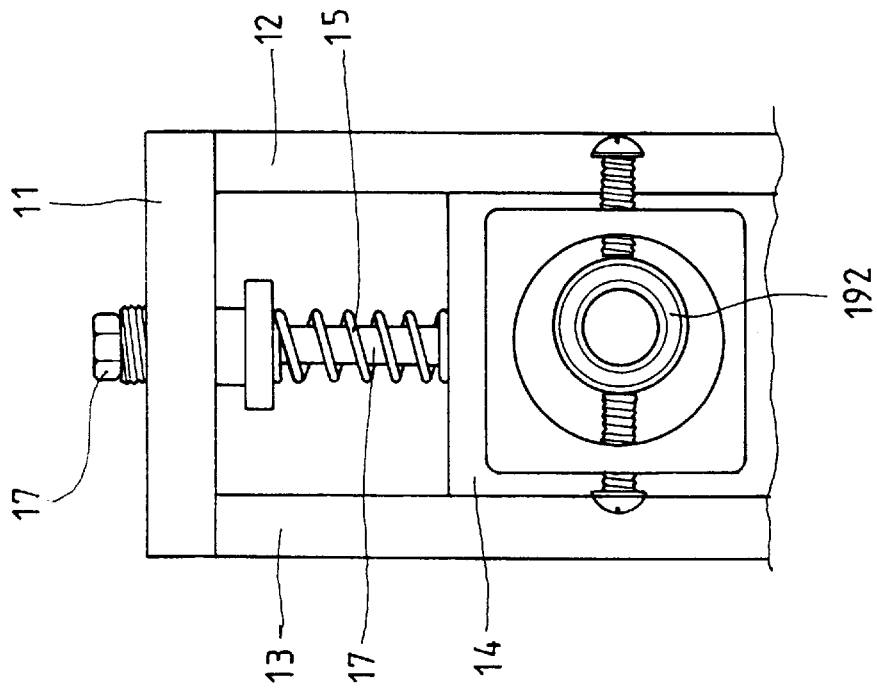
FIG. 9 and 10 show the structure of the adjustable bearing of the present invention.
Figure 9:
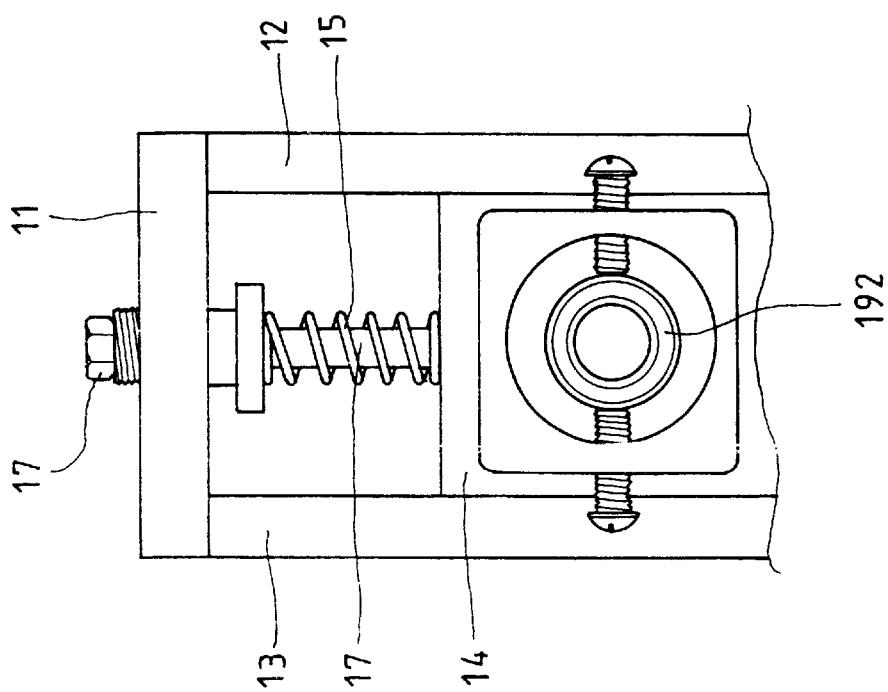

Please refer to FIGS. 1, 2 and 3. The thermal embossing/laminating system of printing machine, according to the present invention, mainly include a left support 10, a right support 20, an upper roller 30, a lower roller 40, an infrared preheating device 200, a temperature measuring device 68,(or 69) and a temperature controlling device. Each support (10, 20) is disposed with an upper board 11 and two upright columns 12, 13 assembled with each other by screw. The inner sides of the columns 12, 13 are formed with slide channels 121, 131 for slidably inserting two lateral projections 141 of a slide block 14, whereby the slide block 14 can be ascended or descended vertically between the columns. Each slide block 14 is formed with a central upper roller shaft hole 142 in which a bearing (not shown) is fitted. A back and forth adjustable bearing 192 is fitted in the other shaft hole as shown in FIG. 9 and 10. A resilient body 15 is fitted with a top cap 16 and a locating shaft 17 and kept compressed downward. A fixing seat 19 is securely disposed on lower side of each of the left and right supports 10, 20. A fixed shaft 41 is rotatably fitted with the fixing seat 19. A lower roller bearing 191 is disposed on the fixed shaft 41 (as shown in FIG. 7), permitting the lower roller 40 to rotate. An eccentrical wheel 42 is fitted around each end of the fixed shaft. One of the eccentrical wheel is disposed with a crank 43 extending from the end of the fixed shaft. Each support is locked with and covered by an outer cover 90.

Figure 2A:
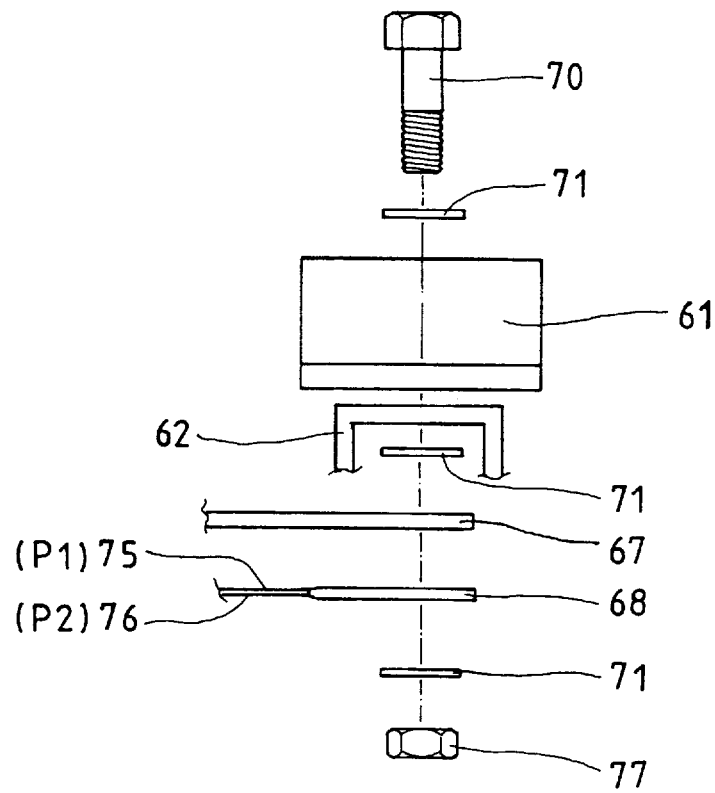
FIG. 2A is a structurally disassembled view of the temperature measuring device of the present invention.
Figure 2B:
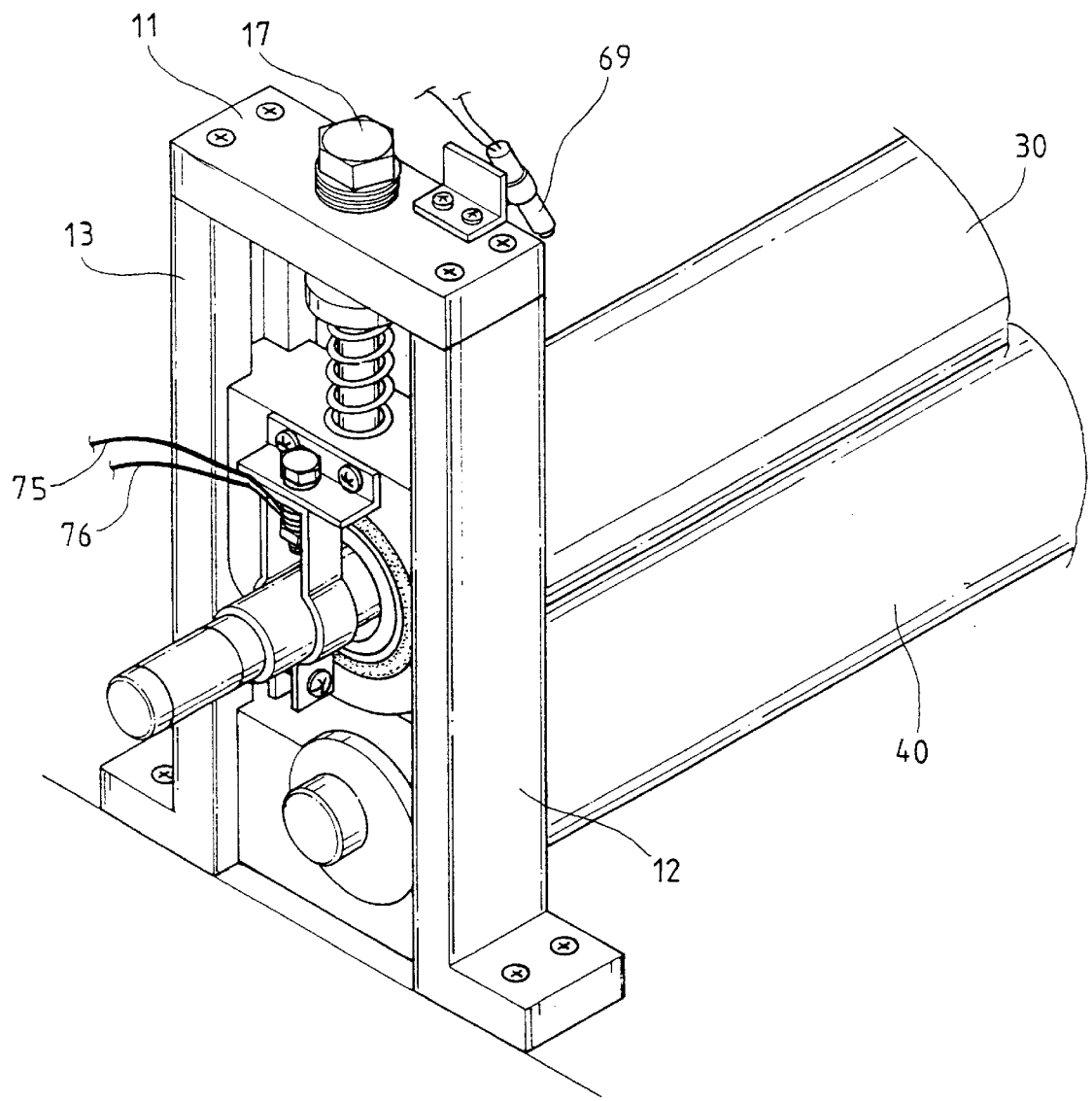
FIG. 2B is a perspective view showing the noncontact infrared temperature detecting device of the present invention.
Figure 2C:
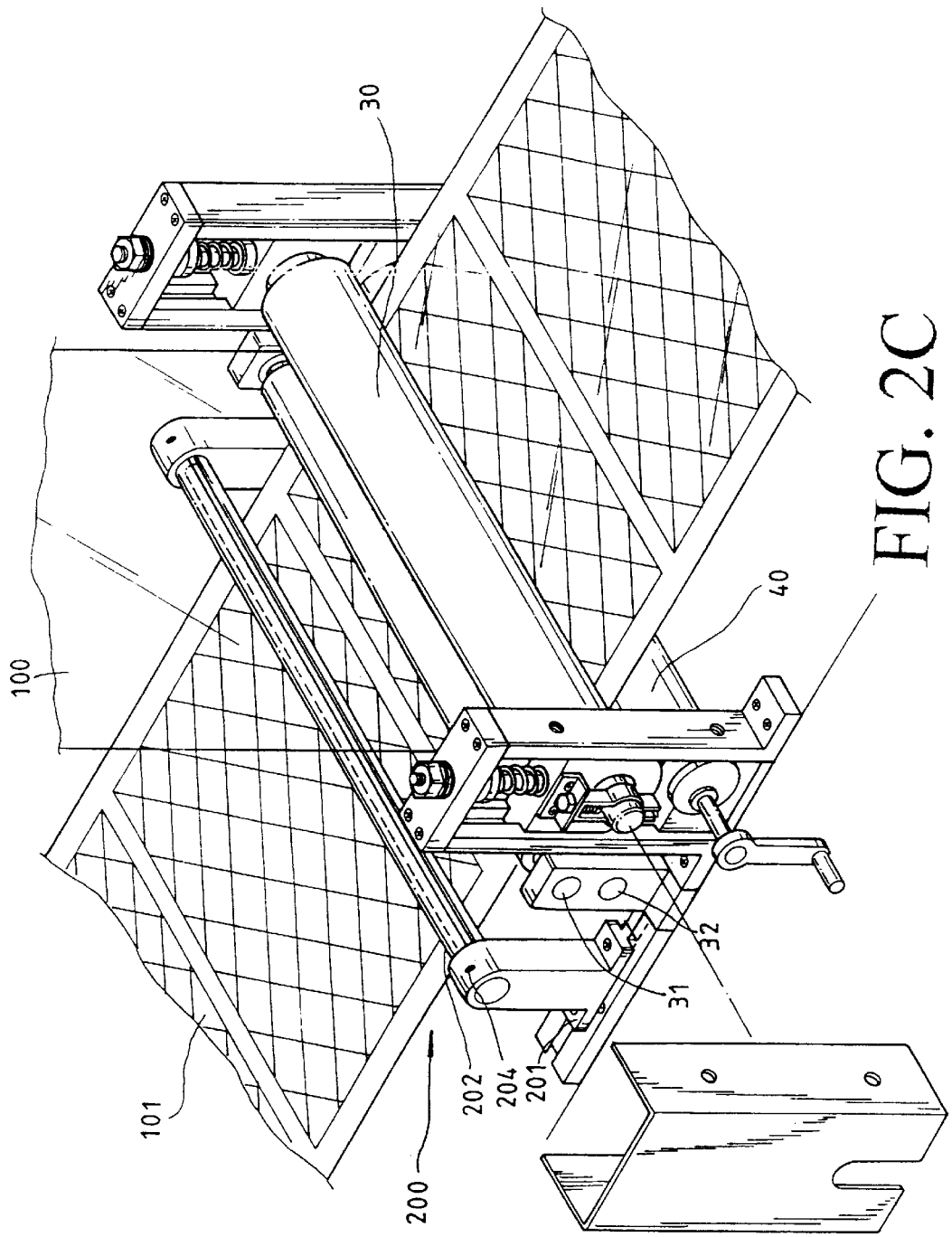
FIG. 2C is a perspective view of the infrared preheating device of the present invention.
Figure 2D:
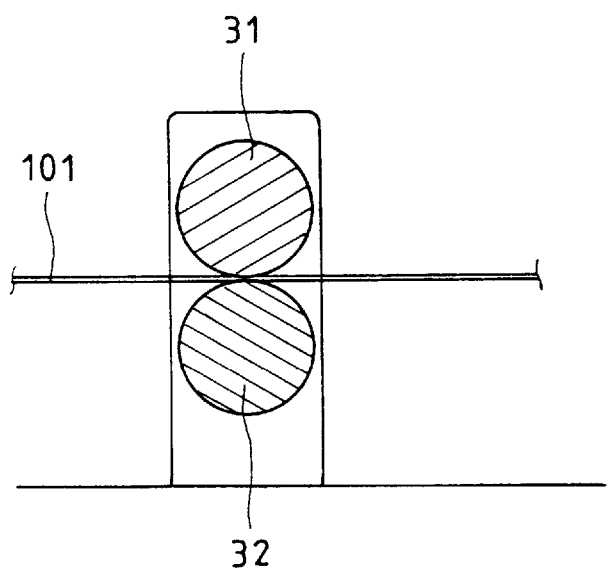
FIG. 2D is a perspective view showing the pressured roller.

Referring to FIG. 1,2C and 2D, when operated, the laminating film with hot melt adhesive 100 is introduced from upper side. And fed from the platform in parallel with the printed article 101. Then after through the pre-rolled upper and lower roller 31, 32 the laminating film with hot melt adhesive 100 and the printed article 101 are thermally rolled and compressed between the upper and lower rollers 30, 40 so that the printed article 101 is thermally laminated with the laminating film with hot melt adhesive 100. The heating effect can be improved by the infrared preheating device as shown in FIG. 2C by way of radiating infrared ray onto the laminating film with hot melt adhesive 100. The infrared preheating device 200 includes a fixing support 201, lamp shade 202 and locating screw 204. The fixing support serves to adjust the distance between the infrared preheating device and the film, whereby the infrared ray can be radiated onto the film optimally. The strength of the light is inverse proportional to the square of the distance. The locating screw 204 serves to adjustably fix the lamp shade at a proper height. Also, the strength of the infrared ray is automatically adjusted and controlled by the temperature measuring device and the temperature controlling circuit, whereby the film can stand at the set constant temperature and the heat can be evenly conducted to the laminating film with hot melt adhesive 100 to melt the same into a state with stickiness.

Referring to FIG. 2 and 2A. The temperature measuring device and heating device 60 (disposed on the slide block 14) of the present invention include fixing means 61, 62, electrical heater 64, heat conducting plate 67 (extending in the inner hole of the electrical heater and the upper roller), thermocouple 68, thermocouple wires 75, 76, screw 70, heat insulating pad 71, leads 72, 73 and temperature controlling circuit. The electrical heater 64 contains internal electrical heating filaments (not shown) for conducting heat to the shaft of the upper roller 30. The thermocouple 68 is hidden in a fixing means 61 to serve as a temperature measuring member. The thermocouple wires serve to transmit the measured information to the temperature controlling circuit so as to generate preset constant temperature of the upper roller 30. Alternatively, a conventional noncontact infrared temperature measuring device 69 (referring to FIG. 2B) can be used instead of the thermocouple for measuring the temperature.

Certainly, technically, an oil or a pneumatic pump with hot oil or steam can be used to create constant temperature of the roller 30 or 40. This is also include in the scope of the present invention.

In the case, that an infrared preheating device (referring to FIG. 2C) is used for infrared preheating, the heat is evenly conducted to the laminating film, whereby the infrared ray is radiated onto the laminating film with hot melt adhesive 100 which stands at the preset constant temperature. As a result, the laminating film is molten to have stickiness. The printed article 101 and the laminating film are parallelly fed from a platform and rolled between the upper and lower roller 30, 40 (which can be conventional rollers without heating means), whereby the laminating film with hot melt adhesive 100 is thermally laminated on the printed article 101 to complete the laminating operation. This is also include in the scope of the present invention.

Figure 2E:
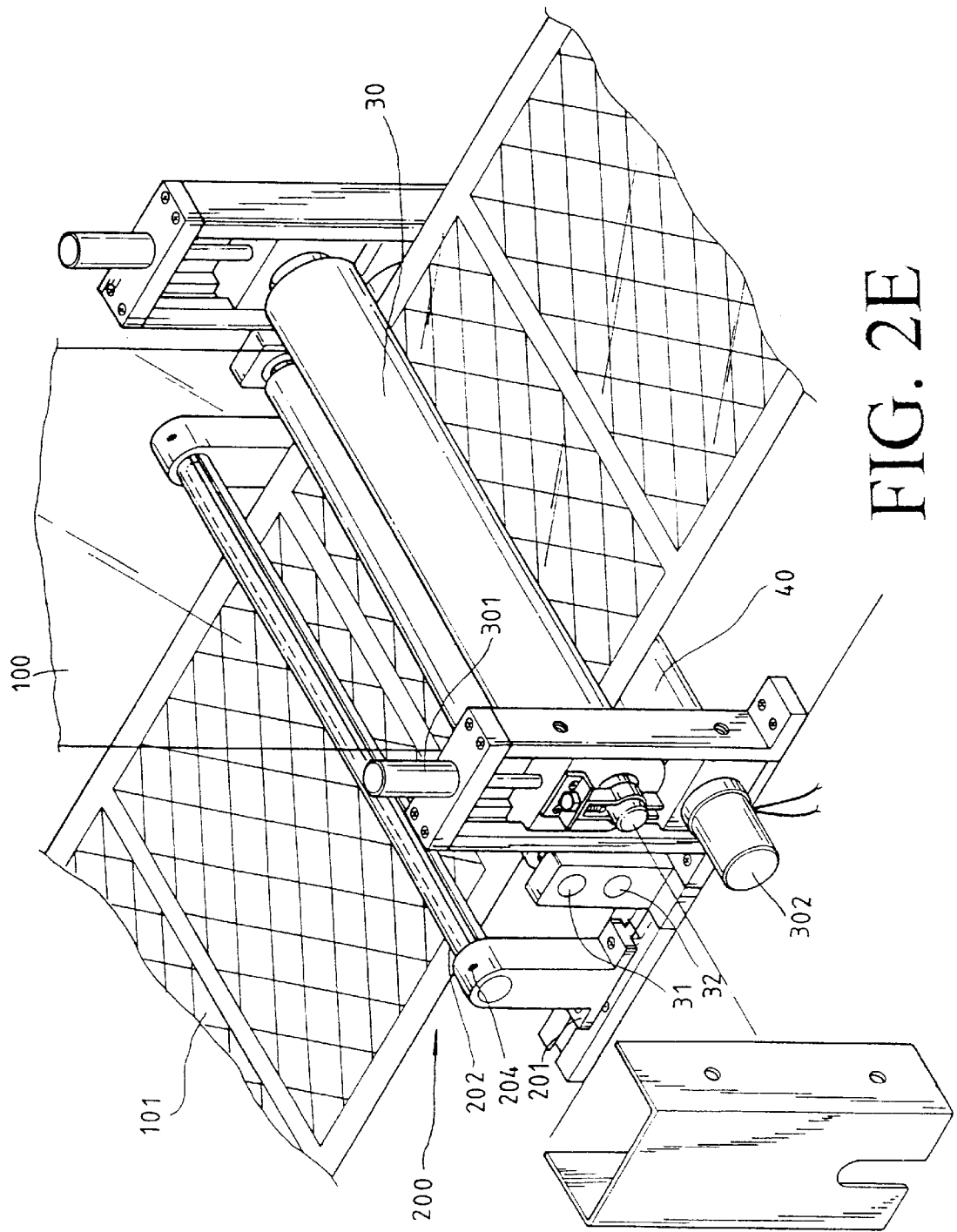
FIG. 2E is a perspective view showing the driving device and the reciprocate motion device.
Figure 4:
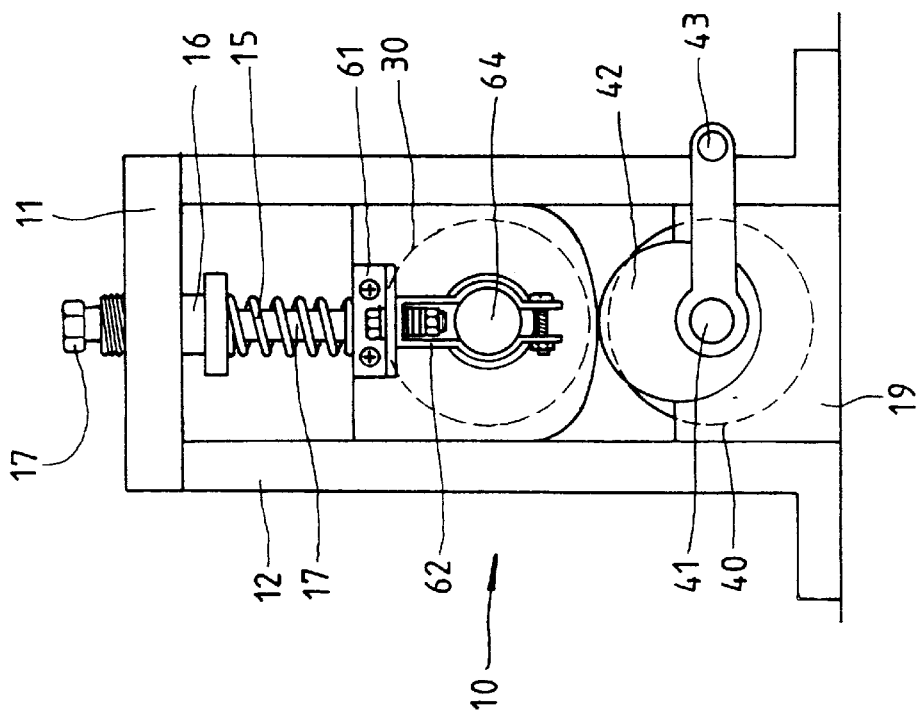
FIG. 4 is a view according to FIG. 3, showing that the upper roller is lifted and spaced from the lower roller.

Referring to FIG. 2E. When the reciprocate motion device 301 is pressed down, the upper roller 30 and the lower roller 40 are closed. When the reciprocate motion device is pulled up, the upper roller 30 and the lower roller 40 are took apart, and form a space between them. Driving device 302 are synchronized with pre-printing device and cutter behind. When used for thermal embossing, heat transfer and hot stamping, device 15, 16, 17, 42 and 43 which show in FIG. 5 can be replaced by driving device 302 and reciprocate motion device 301. FIG. 3 and 4 show the structure of the left support 10. The eccentrical wheel 42 is rotatably fitted on a shaft rod extending outward from the fixed shaft 41. The crank 43 is secured to the end of the fixed shaft 41. The lower roller 40 has a central shaft hold (referring to FIG. 7). Two bearings are fitted in two ends of the shaft hole and then fixed shaft 41 is fitted into the shaft hole. A driving device is connected to drive the lower roller. When the crank 43 is biased, the slide block 14 is lifted by the eccentrical wheel 42 to force the resilient body 15 upward. Accordingly, the upper and lower rollers 30, 40 are spaced from each other when free from the laminating operation.

Figure 5:
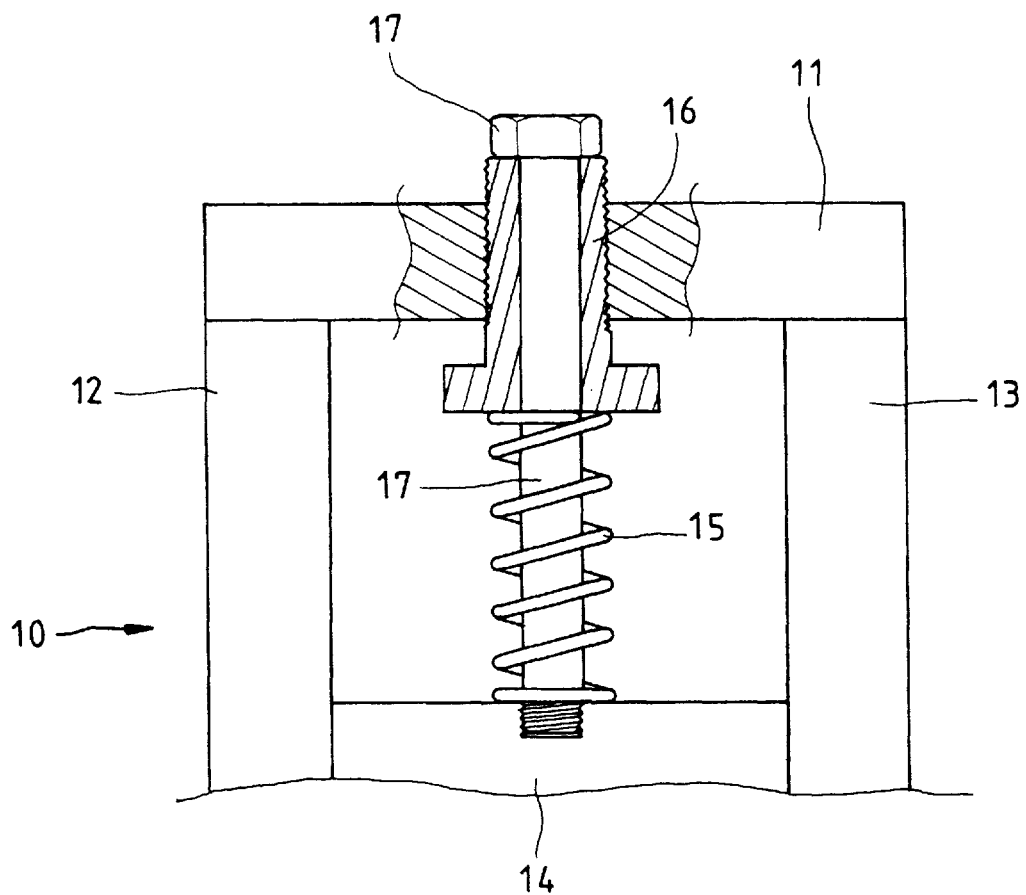
FIG. 5 is a sectional view showing the structure of the support of the present invention.

Referring to FIG. 5, the lateral projections 141 of the slide block 14 are slidably inserted in the slide channels between the two columns 12, 13 (as shown in FIG. 2). The top cap 16 is formed with outer thread for fastening the top cap on the upper board 11. The locating shaft 17 is passed through the center of the top cap 16 to connect with the slide block 14. In normal state, the slide block 14 is depressed by the resilient force of the resilient body 15. By means of adjusting the vertical position off the top cap 16, the force exerted onto the slide block 14 by the resilient body 15 is changed. So that the clamping force of the upper roller 30 and the tightness between the upper and lower roller can be adjusted.

Figure 6A:
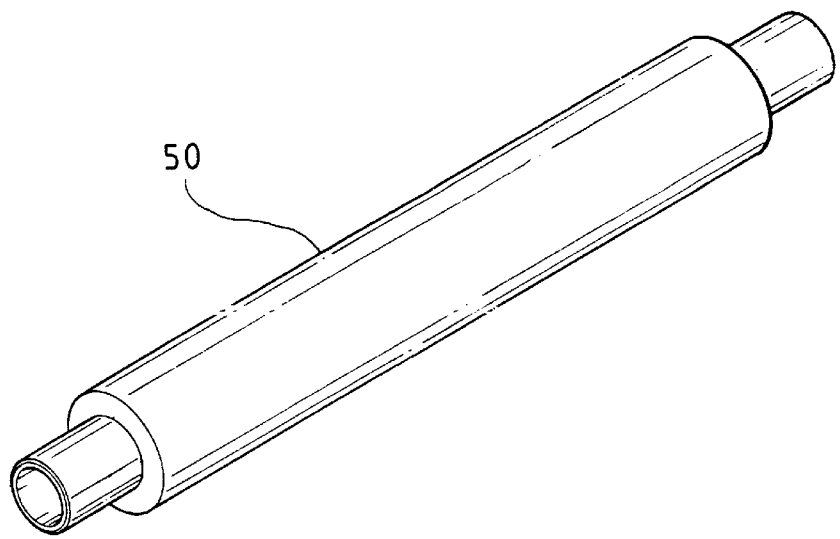
FIG. 6A shows a first type of roller of the present invention.
Figure 6B:
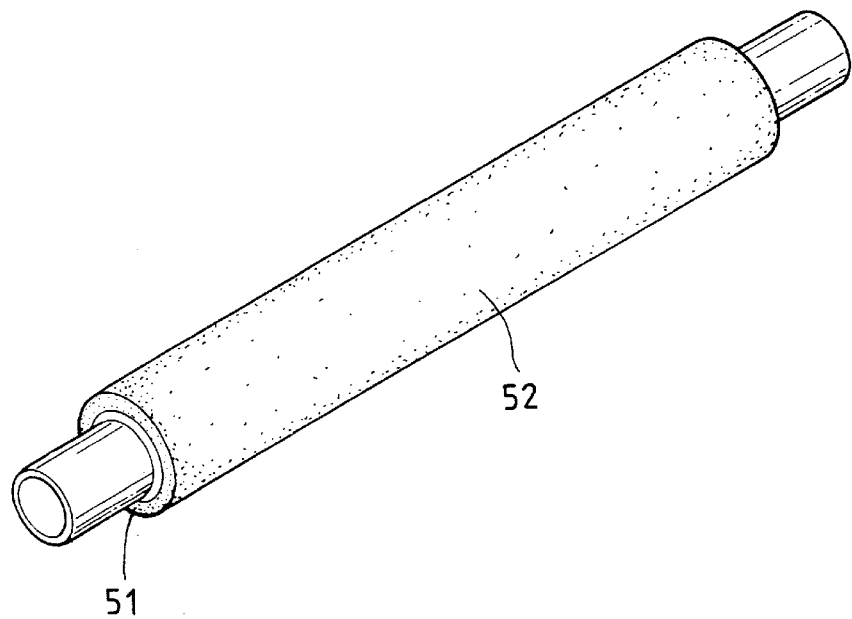
FIG. 6B shows a second type of roller of the present invention.

FIG. 6A shows the structure of the roller. The roller body 50 is made of special steel material integrally. A heating device is added to the shaft to evenly conduct heat thereto with a good heat conducting effect. FIG. 6B shows another type of the roller in which the inner shaft core 51 is made of special steel material. The outer surface of the shaft core is coated with a layer of heat-resistant silicone rubber 52 with better heat conserving effect. Moreover, when thermally rolling the embossing/laminating film, a better tightness and less friction of the laminating surface are achieved.

Figure 8:
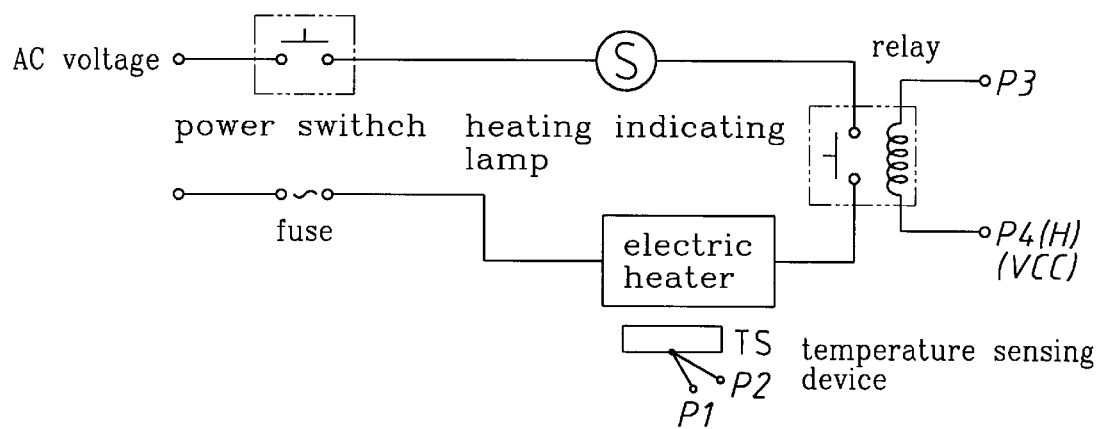
FIG. 8 is a block diagram of the system circuit of the present invention.
Figure 8A:
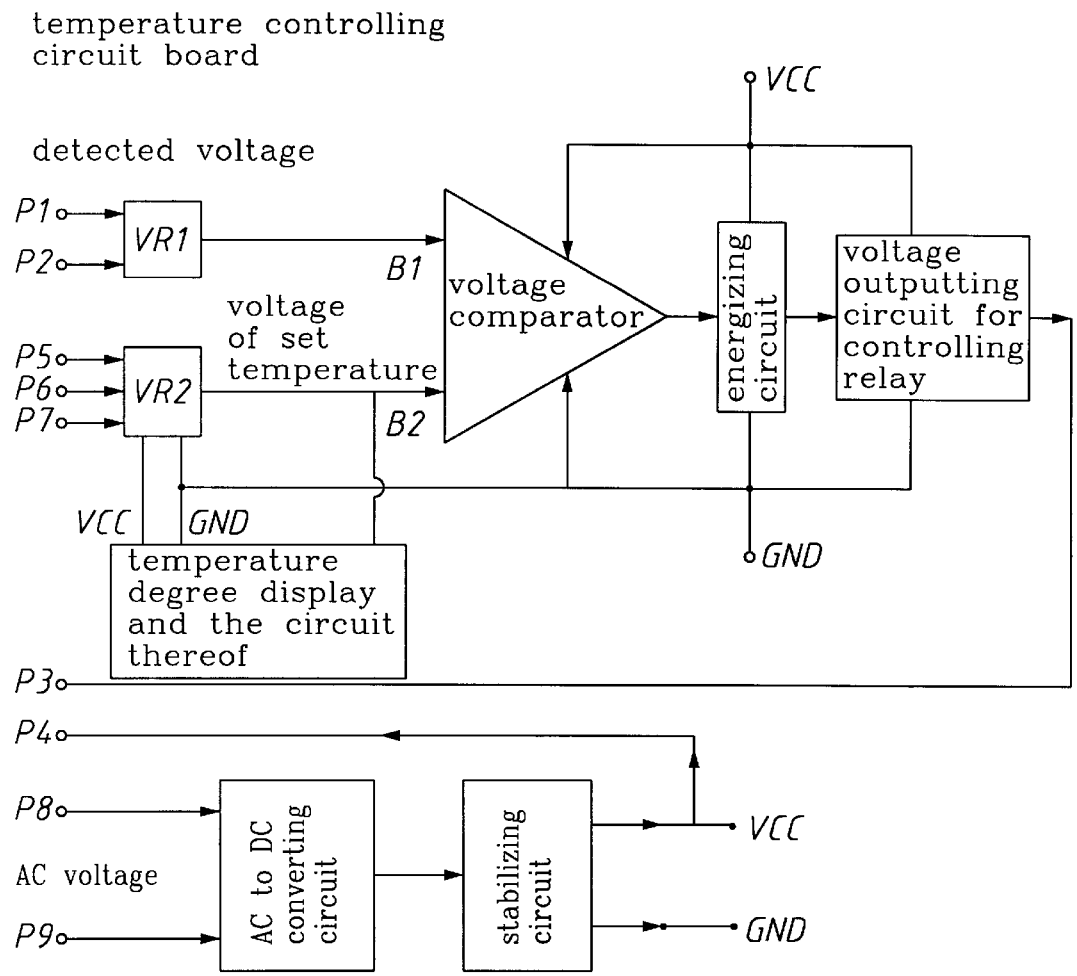
FIG. 8A is a block diagram of the temperature controlling circuit board of the present invention.
Figures 1, 8A:
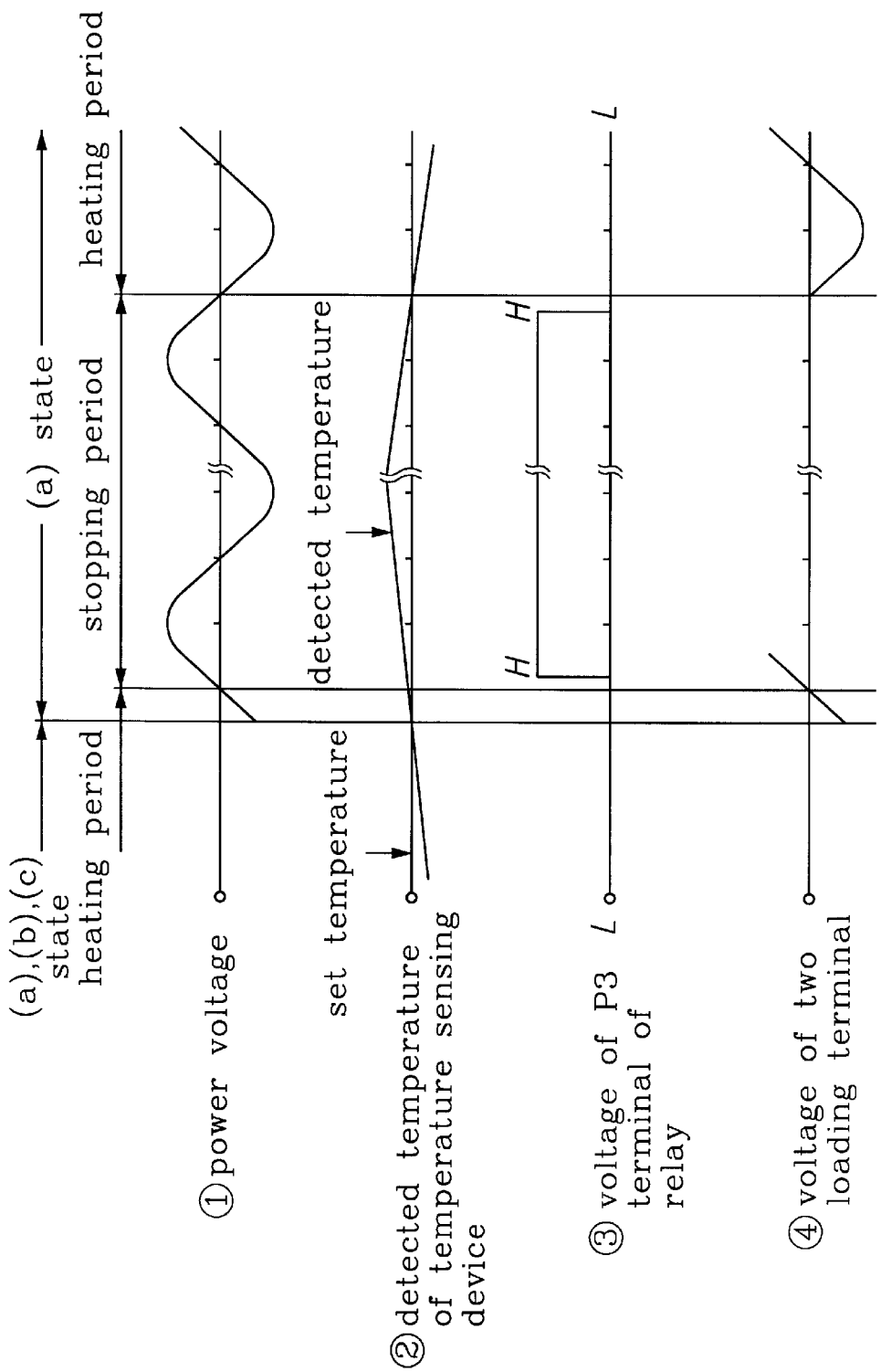

FIGS. 8 and 8A show an embodiment of the temperature controlling device of the present invention, which operates in the following manner:

(a) When the power switch is switched on and the fuse functions well to close the circuit (referring to FIG. 8):
  (1) P8, P9 are AC power terminals. The AC power passes through an AC to DC converting circuit and stabilizing circuit and a stable DC voltage is output. This power provided for VR2, temperature degree display, the circuit of the display, voltage comparator, energizing circuit and voltage output circuit of controlling relay. Simultaneously, the power is served as the high level potential (P4) of the relay.
  (2) P1, P2 are voltage input terminals of the temperature sensing device for detecting the temperature. After through VE1 (variable resistor for adjust the voltage), the detected voltage B1 (VB1) from the temperature sensing device is output as an input of the voltage comparator.
  (3) P5, P6 and P7 are temperature setting input terminals. After passing through VR2 (variable resistor for adjusting the voltage), the voltage serves as the other input B2 (VB2) of the voltage comparator, and as the input of the temperature degree display circuit that displaying the set temperature.
  (4) When the detected temperature of the temperature sensing device TS is higher than the set temperature: VB1>VB2, after passing through the voltage comparator, energizing circuit and the voltage output circuit of the controlling relay, P3 outputs high potential H to open the relay. Therefore, the power for the electrical heater is cut off and the electrical heater cannot provide heating effect and the heating indicating lamp is turned off.
  (5) When the detected temperature of the temperature sensing device TS is lower than the set temperature: VB1>VB2, after passing through the voltage comparator, energizing circuit and the voltage output circuit of the controlling relay, P3 outputs low potential L to close the relay. Therefore, the electrical heater is powered on and the electrical heater starts to provide heating effect and the heating indicating lamp is turned on.

(b) When the power switch is switched on and the fuse malfunctions:
  The system circuit is opened and all the circuits lose their functions. The heating indicating lamp, the relay, the temperature controlling circuit board and the electrical heater all cannot be work. However, the temperature sensing device is not effected and can still detect the voltage of the temperature and output P1, P2.

(c) When the power switch is switched off and the fuse function well: The situation is the same as (b).

(d) When the power switch is switched off and the fuse malfunction: The situation is the same as (b).

(e) The working wave forms of situation (a), (b), (c), (d) are shown is FIG. 8A-1.

According to the above arrangement, the operation and product of the present invention have the following features:

1. No wasted substrate. The laminating film is free from adhesion in normal state. So that they don't need any substrate and the problem of environmental pollution is eliminated.
2. High efficiency. With respect to the same thickness of reel of laminating film, because the film of the present invention is free from adhesion in normal state and without any substrate, the film will have longer length. That is, with the same thickness of reel of the laminating film, the material replacing interval of this invention is longer than the conventional one. (In general, one reel of the conventional laminating film has a length of 200M, while the present invention can have a length of 2000M to 3000M.)
3. Low noise. Since no self-attaching film is torn apart during the laminating operation only little noise is produced.
4. Fast laminating speed. Since the film of this invention is free from adhesion in normal state, the releasing operation of substrate of the film is unnecessary. The laminating operation can be performed fully in cooperation with the printing speed of the printing machine. Therefore, the efficiency of the laminating operation can be greatly increased.
5. Practicability. The present invention is equipped with a manually operated switch for selectively providing heating effect or not. This permits the present invention to be applied to both the conventional laminating measure and the thermally laminating measure or 'A' type laminating measure.
6. No bubble, crimp and can do hot stamping or heat transfer on the laminated surface. The film of the present invention is free from adhesion in normal state. So that it can be planely attached to the printed article without any bubble or crimp on the laminating surface. Because of that, further operation of hot stamping or thermal transfer on the laminated surface is possible. Therefore, the ratio of defective products is extremely low.

7. Excellent transparency. The thermally melton embossing/laminating film itself is free from adhesion in normal state. So that after laminated, the film has better transparency than the conventional one.

8. 'A' type laminating measure is applicable. The surface of the printed article is painted with laminating oil and then thermally rolled to laminating the printed article.

9. Hot stamping function. A hot stamping board can be fixed or sculptured on the roller. So that the roller can perform hot stamping function by thermal rolling.

10. Thermal transfer printing. This invention can thermally roll the thermal transfer printing film to achieve thermal transfer printing effect.

11. Thermal embossing. The embossing mold can be fixed or sculptured on the roller of this invention. So that the roller can achieve thermal compression printing effect by thermal rolling.

It should be noted that the above description and accompanying drawing are only used to illustrate some embodiment of the present invention, not instead to limit the scope thereof. Any modification of the embodiments should fall within the scope of the present invention.

What is claimed is:

1. A thermal embossing/laminating system of printing machine, comprising a left support, a right support, an upper roller, a lower roller, a heating device, an infrared preheating device, a temperature measuring device and a temperature controlling device, wherein:

each support is disposed with an upper board and two upright columns assembled with each other, the inner sides of the columns being formed with slide channels for slidably inserting two lateral projections of a slide block, the slide block being formed with a central upper roller shaft hole in which a back and forth adjustable bearing is fitted, a resilient means being adjustably disposed on the slide block, a fixing seat being securely disposed on lower side of each of the left and right supports, a fixed shaft being rotatably fitted with the fixing seat, a lower roller bearing being disposed on the fixed shaft of the eccentrical wheel;

one end of the upper roller is passed into the shaft hole of the left slide block and the back and forth adjustable bearing, and the other end thereof is passed into the bearing in the shaft hole of the right slide block; and two ends of the lower roller are passed into the bearings of the fixed shaft of the eccentrical wheels of the left and right supports, while the lower roller is drived by a driving device;

said system being characterized in that: at least one of the shafts of the upper and lower rollers is disposed with a heating device and an infrared preheating device is disposed beside the supports, whereby the temperature controlling device and temperature measuring device automatically detect temperature and adjust the heating device, so that the heating device evenly conducts and distributes heat to the roller and laminating film cause the shafts of the rollers and the infrared preheating device reach and stand at a set constant temperature, the laminating film with hot melt adhesive being thermally rolled by the rollers to be easily and planely laminated on the surface of the printed article.

2. A system as claimed in claim 1, wherein the temperature controlling device employs a thermocouple as a temperature detecting member for reaching the set constant temperature and accomplishing the thermally rolling operation.

3. A system as claimed in claim 1, wherein the temperature measuring device employs noncontact infrared ray as the temperature detecting member in cooperation with the infrared preheating device and temperature controlling device for automatically controlling the temperature so as to heat the rollers and the laminating film to the set constant temperature.

4. A system as claimed in claim 1, wherein the back and forth adjustable bearing is disposed in the central shaft hole of one of the slide block, and a heat conducting plate and temperature measuring device are disposed on the slide block, whereby through the temperature controlling device, the rollers reach and stand at the set constant temperature.

5. A system as claimed in claim 1, wherein the heating device can be replaced by a hot oil system.

6. A system as claimed in claim 1, wherein the heating device can be replaced by a steam system.

7. A system as claimed in claim 1, wherein a hot stamping board is fixed on one of the upper and lower rollers.

8. A system as claimed in claim 1, wherein at least one of the upper and lower rollers is sculptured with a mold.

9. A system as claimed in claim 1, wherein a printing mold is fixed on at least one of the upper and lower rollers.

* * * * *